United States Patent
Oram et al.

(10) Patent No.: US 9,546,696 B2
(45) Date of Patent: Jan. 17, 2017

(54) DRIVELINE DISCONNECT DEVICE

(71) Applicant: GKN Driveline North America, Inc., Auburn Hills, MI (US)

(72) Inventors: Samuel J. Oram, Rochester Hills, MI (US); Richard E. Bastien, Oxford, MI (US); Lei Yang, Novi, MI (US); Mark A. Heinze, Tecumseh (CA)

(73) Assignee: GKN DRIVELINE NORTH AMERICA, INC., Auburn Hills, MI (US)

( * ) Notice: Subject to any disclaimer, the term of this patent is extended or adjusted under 35 U.S.C. 154(b) by 237 days.

(21) Appl. No.: 14/268,528

(22) Filed: May 2, 2014

(65) Prior Publication Data

US 2015/0316110 A1  Nov. 5, 2015

(51) Int. Cl.
| | | |
|---|---|---|
| F16H 57/00 | (2012.01) | |
| F16D 11/14 | (2006.01) | |
| F16H 1/06 | (2006.01) | |
| F16D 27/118 | (2006.01) | |
| F16D 27/112 | (2006.01) | |

(Continued)

(52) U.S. Cl.
CPC ............. *F16D 11/14* (2013.01); *F16D 27/112* (2013.01); *F16D 27/118* (2013.01); *F16H 1/06* (2013.01); *F16D 27/14* (2013.01); *F16D 2011/006* (2013.01); *Y10T 74/19614* (2015.01)

(58) Field of Classification Search
CPC  F16D 27/118; F16D 2011/006; F16D 27/004; F16D 11/14; F16D 2500/10425; F16D 2500/10431; F16D 2500/10462; B60K 23/08; F16H 63/304; F16H 2063/305

See application file for complete search history.

(56) References Cited

U.S. PATENT DOCUMENTS

| | | |
|---|---|---|
| 4,811,824 A | 3/1989 | Kurihara |
| 8,443,954 B2 | 5/2013 | Quehenberger et al. |
| 8,584,785 B2 | 11/2013 | Marsh et al. |

(Continued)

FOREIGN PATENT DOCUMENTS

WO   WO2012145580 A1   10/2012

OTHER PUBLICATIONS

International Search Report for PCT/US2014/033989, dated Aug. 22, 2014, 2 pages.

*Primary Examiner* — William Kelleher
*Assistant Examiner* — Jake Cook
(74) *Attorney, Agent, or Firm* — Jennifer M. Brumbaugh; Reising Ethington P.C.

(57) ABSTRACT

In at least some implementations, a disconnect assembly for a driveline component, such as a power transfer unit, may include an input shaft, a disconnect shaft selectively rotated by the input shaft and an output shaft coupled to the disconnect shaft. A first gear is coupled to the disconnect shaft and a second gear is coupled to the output shaft and to the first gear so that the output shaft rotates when the disconnect shaft rotates. A connection feature is movable between an engaged position in which the input shaft and disconnect shaft are coupled and a disengaged position in which the input shaft rotates relative to the disconnect shaft. The connection feature includes a first part carried by the gear for rotation therewith and a second part movable relative to the first part and carried by the input shaft for rotation with the input shaft.

19 Claims, 11 Drawing Sheets

(51) Int. Cl.
F16D 11/00 (2006.01)
F16D 27/14 (2006.01)

(56) References Cited

U.S. PATENT DOCUMENTS

| | | | |
|---|---|---|---|
| 8,597,150 | B1 | 12/2013 | Downs et al. |
| 2005/0279601 | A1 | 12/2005 | Tuday |
| 2005/0279607 | A1* | 12/2005 | Fusegi .................. F16D 27/118 |
| | | | 192/84.96 |
| 2008/0058151 | A1 | 3/2008 | Curtis |
| 2010/0089685 | A1 | 4/2010 | Quehenberger et al. |
| 2014/0020490 | A1* | 1/2014 | Greiss .................. B60K 17/344 |
| | | | 74/405 |

* cited by examiner

FIG. 21

DRIVELINE DISCONNECT DEVICE

TECHNICAL FIELD

The present disclosure relates generally to vehicle drivelines, and more specifically to a disconnect device for one or more driveline components.

BACKGROUND

Power transfer units are commonly utilized in front-wheel drive based all-wheel drive systems. Power transfer units may include a disconnect device so that power is transferred to only the front wheels during certain vehicle operating conditions. The disconnect device uncouples the linkage and shafts between the power transfer unit and the rear wheels of the vehicle when the rear wheels need not be actively driven. The disconnect device includes a shift collar that couples aligned portions of co-linear shafts and a cam device coupled to the shift collar to move the shift collar between engaged and disengaged positions. In the engaged position, the shift collar couples the shafts for co-rotation and in the disengaged position, the shafts are not coupled and may rotate independently of one another. Coupling and decoupling rotating shafts presents many challenges including, but not limited to, noise, vibration and harsh tactile feedback generated in the system.

SUMMARY

In at least some implementations, a disconnect assembly for a driveline component may include an input shaft rotated about an axis, a disconnect shaft selectively rotated by the input shaft and an output shaft coupled to the disconnect shaft. A first gear is coupled to the disconnect shaft for rotation with the disconnect shaft and a second gear is coupled to the output shaft and to the first gear so that the output shaft rotates when the disconnect shaft rotates. A connection feature is movable between an engaged position in which the input shaft and disconnect shaft are coupled for co-rotation and a disengaged position in which the input shaft rotates relative to the disconnect shaft. The connection feature includes a first part carried by the gear for rotation with the gear and a second part movable relative to the first part and carried by the input shaft for rotation with the input shaft.

In at least some implementations, a driveline component for a vehicle includes an input shaft rotated about an axis, a disconnect shaft selectively rotated by the input shaft, and an output shaft coupled to the disconnect shaft to rotate when the disconnect shaft rotates. A disconnect device that selectively couples together the input shaft and the disconnect shaft so that the output shaft is selectively rotated. The disconnect device includes a connection feature that is movable between an engaged position in which the input shaft and disconnect shaft are coupled and a disengaged position in which the input shaft rotates relative to the disconnect shaft. The disconnect device includes a drive that causes movement of the connection feature from at least one of the engaged position and the disengaged position to the other of the engaged position or disengaged position. The disconnect device includes a retention feature that releasably retains the connection feature in at least one of the engaged position or disengaged position.

In at least some implementations, a disconnect assembly for a driveline component includes an input shaft rotated about an axis, a disconnect shaft selectively rotated by the input shaft, an output shaft, an output shaft gear coupled to the output shaft and a disconnect shaft gear coupled to the disconnect shaft and to the output shaft gear so that the output shaft rotates when the disconnect shaft rotates. The disconnect shaft gear carries a bearing surface for a bearing that journals the disconnect shaft for rotation.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Figure 1:
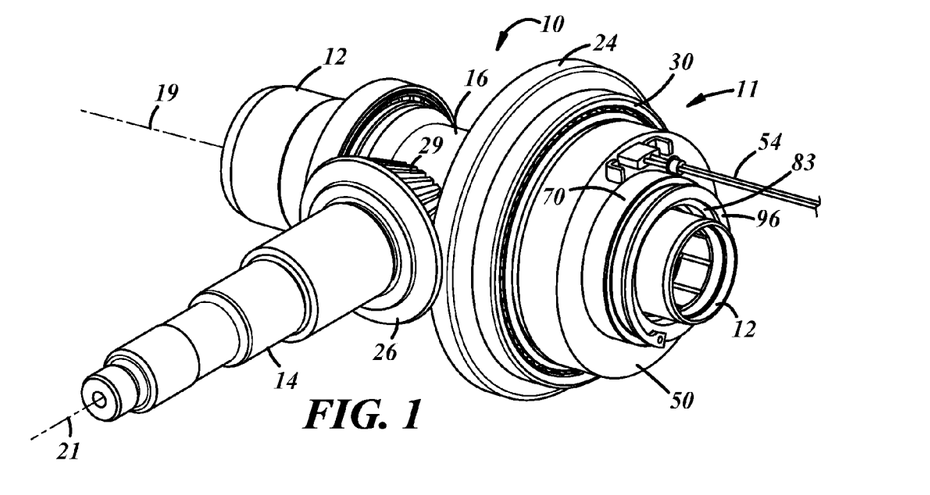
FIG. 1 is a perspective view of a portion of a power transfer unit (PTU) showing an input shaft, output shaft and a disconnect device that selectively couples the input and output shafts.
Figure 2:
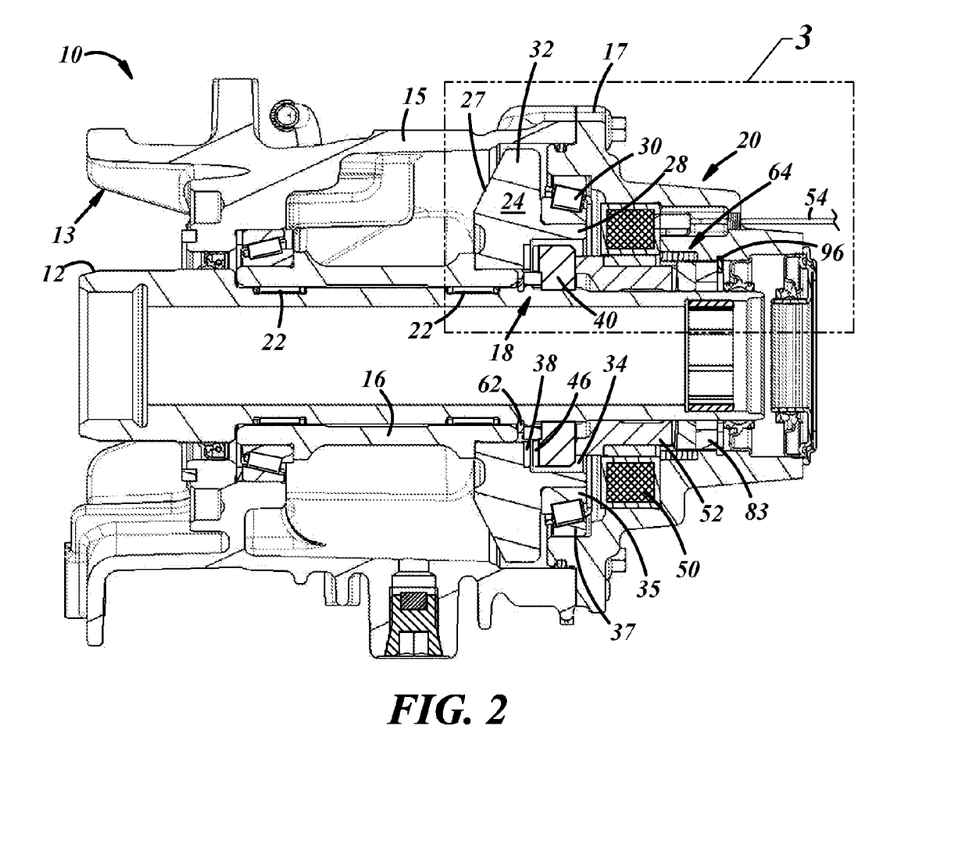
FIG. 2 is a sectional view of the PTU including a housing, the input shaft, output shaft and disconnect device.
Figure 3:
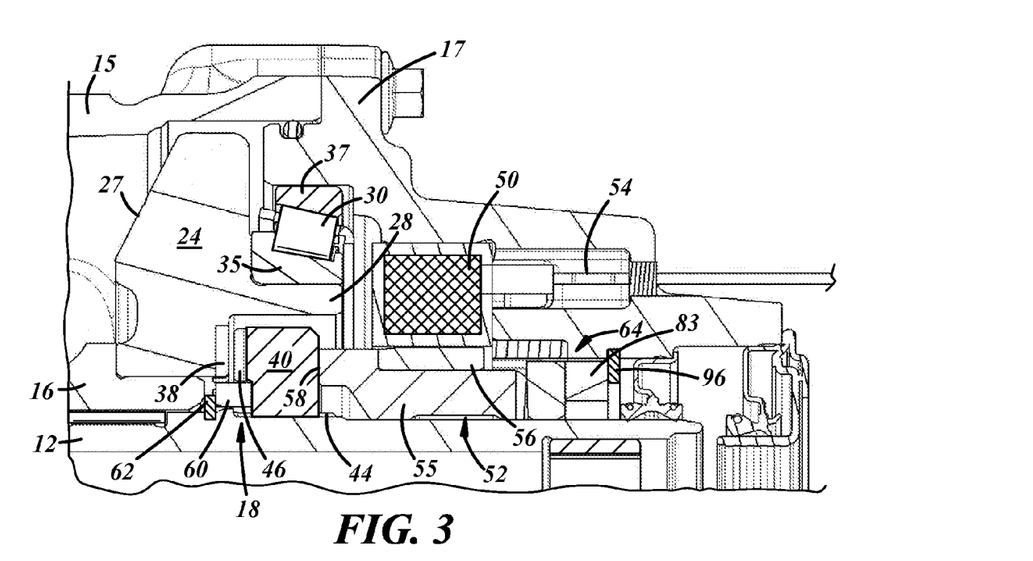
FIG. 3 is a fragmentary sectional view showing the disconnect device in a disconnected position.
Figure 4:
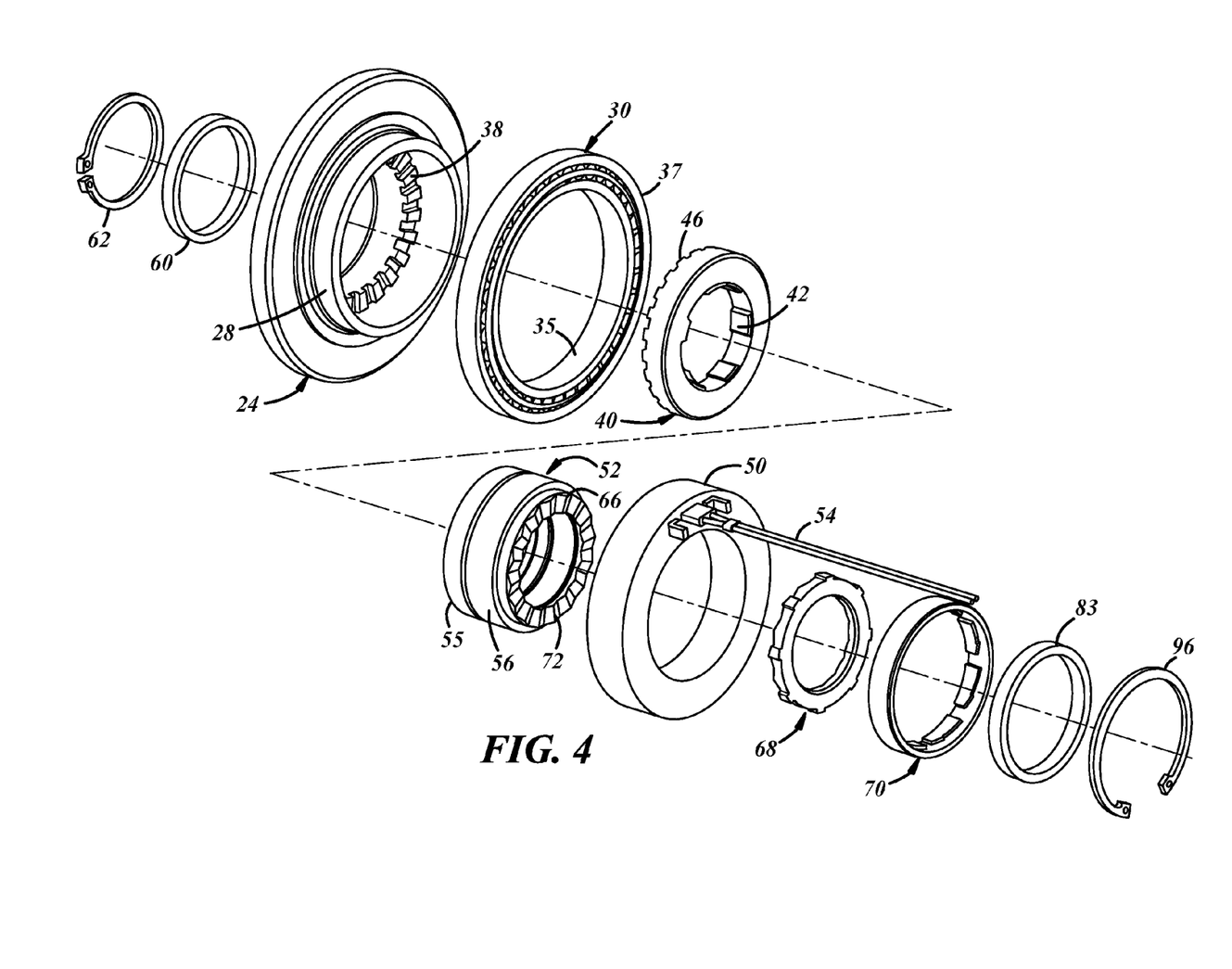
FIG. 4 is an exploded perspective view of components of the disconnect device.
Figure 5:
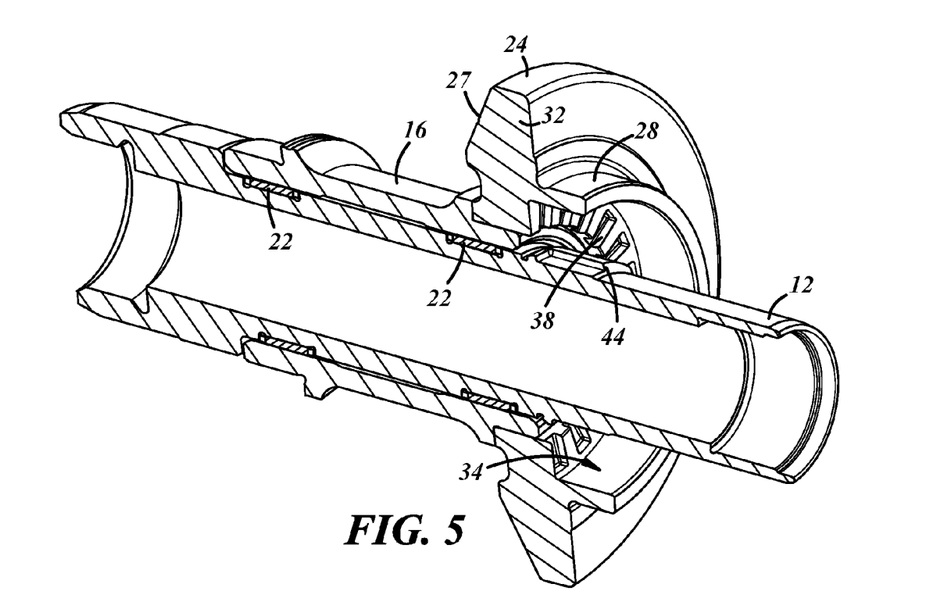
FIG. 5 is a perspective sectional view showing the input shaft, a disconnect shaft and a gear coupled to the disconnect shaft.
Figure 6:
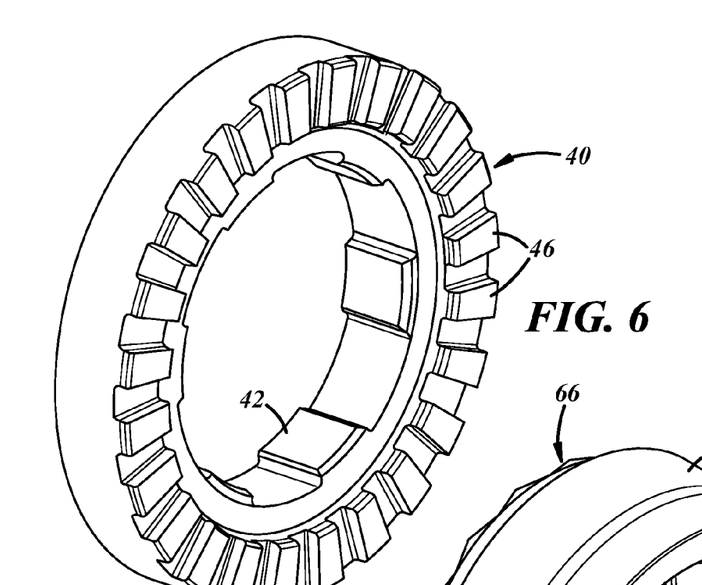
FIG. 6 is a perspective view of a collar.
Figures 7, 8:
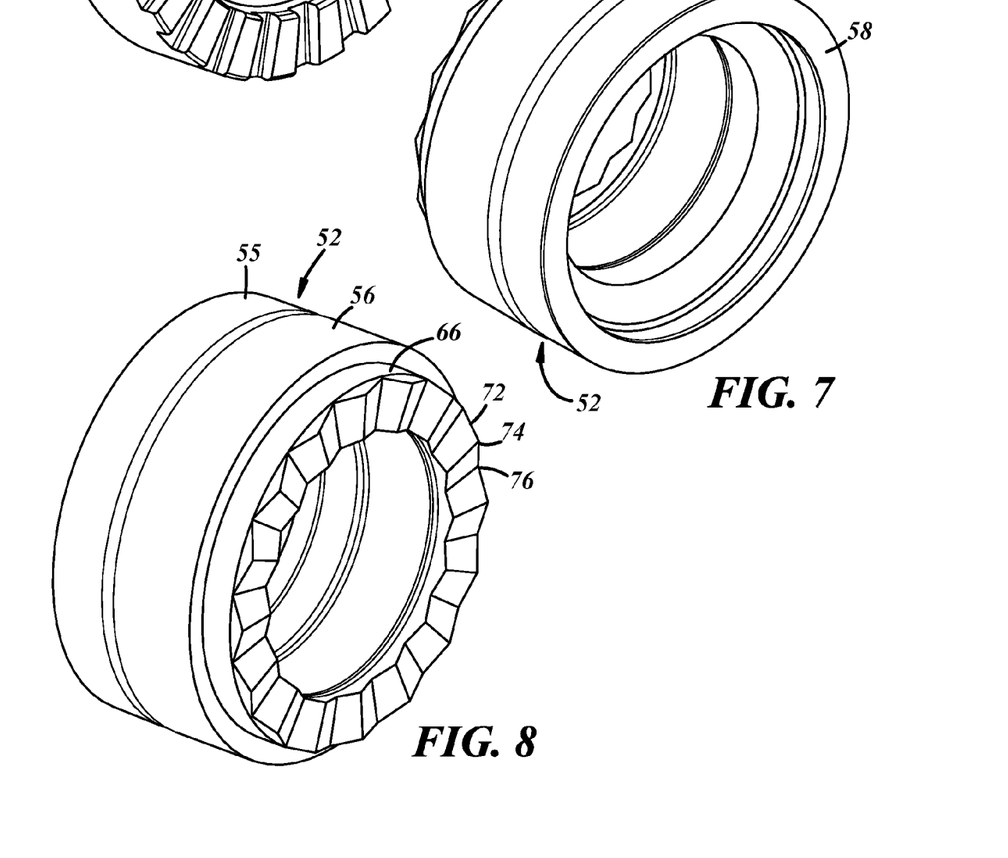
FIGS. 7 and 8 are perspective views of a plunger and cam.

Referring in more detail to the drawings, FIGS. 1-3 show a power transfer unit 10 (PTU) for a vehicle driveline that includes a disconnect device 11 that selectively couples an input shaft 12 and an output shaft 14 to selectively drive the output shaft 14. When the output shaft 14 is not driven for rotation, the vehicle operates in the first mode wherein a first number of vehicle wheels are actively driven, and when the output shaft 14 is driven, the vehicle operates in the second mode wherein power is provided to additional vehicle wheels. In at least one implementation in a vehicle with four wheels, the first mode of operation includes two-wheel drive vehicle operation and the second mode includes all-wheel drive vehicle operation. Hence, the disconnect device 11 permits the vehicle to be selectively operated in the first and second modes. While shown and described with reference to a PTU, features of the disconnect device, separately and in various combinations, may be used in other disconnect devices, such as for side shaft or other vehicle driveline components.

As shown in FIGS. 2 and 3, the PTU 10 may include a housing 13 into which the input shaft 12 extends, and from which the output shaft 14 extends. The housing 13 may include a main body 15 and a cover 17 connected to the main body. The input shaft 12 may rotate relative to the housing 13 about an axis 19, and the output shaft 14 may rotate relative to the housing 13 about a different axis 21.

The disconnect device 11 may include a disconnect shaft 16, a connection feature 18 and an actuator 20. The disconnect shaft 16 is coupled to the output shaft 14 and selectively coupled to the input shaft 12 by the connection feature 18. The actuator 20 drives the connection feature 18 between a connected position (FIG. 13) and a disconnected position (FIGS. 2 and 3). In the connected position, the disconnect shaft 16 is coupled to the input shaft 12 and hence, the output shaft 14 is coupled to the input shaft. In the disconnected position, the disconnect shaft 16 is not coupled to the input shaft 12 and hence, the output shaft 14 is not coupled to the input shaft 12. In this way, the input shaft 12 is selectively coupled to the output shaft 14 so that the output shaft 14 is selectively driven by the input shaft 12 to achieve the first and second modes of vehicle operation.

In at least some implementations, and as shown in FIGS. 2, 3, 5 and 13, the disconnect shaft 16 may be tubular, received over and coaxially and circumferentially surrounds part of the input shaft 12. Suitable bearings may be provided adjacent to both ends of the disconnect shaft 16 and the PTU housing 13 as well as between the disconnect shaft 16 and the input shaft 12, to permit rotation of the input shaft 12 relative to the disconnect shaft 16 when these components are not coupled together. In at least some implementations, the bearings between the input shaft 12 and disconnect shaft 16 may include needle roller bearings 22. The needle roller bearings 22 may sufficiently support and journal the input shaft 12 for rotation that a ball bearing support at an axial end of the input shaft 12 can be eliminated, which enables the axial length of the input shaft 12 to be reduced, providing a more compact assembly. The disconnect shaft 16 is coupled to a first gear 24 that mates with a second gear 26 (FIG. 1) coupled to the output shaft 14, so that the disconnect shaft 16 and output shaft 14 rotate together.

As shown in FIGS. 1-5, the first gear 24 may be annular, and may coaxially and circumferentially surround part of the disconnect shaft 16. The first gear 24 may be fixed to the disconnect shaft 16 such as by a weld, bolts, screws, or a press-fit, although other connections may be used. Teeth 27 formed in the first gear 24 are meshed with teeth 29 (FIG. 1) of the second gear 26 so that the second gear 26 and output shaft 14 are driven by the first gear 24 and disconnect shaft 16. The first gear 24 may also include a bearing surface 28 for one or more bearings 30 provided between the disconnect shaft 16 and the PTU housing 13.

In the implementation shown, and as can be seen in FIGS. 2-5, the bearing surface 28 is integrally formed with or otherwise directly carried by the first gear 24 as a flange that extends axially from a main body 32 of the first gear 24. The flange 28 may be radially spaced from the input shaft 12, and may axially overlap the input shaft 12 defining an annular space 34 between the flange 28 and input shaft 12. In the implementation shown, the flange 28 extends from a side of the main body 32 opposite to the teeth 27 and the flange 28 may define an axial end of the disconnect shaft 16. In this way, the bearing 30 may be provided closely adjacent to the end of the disconnect shaft 16 and the connection feature 18 that selectively couples together the input shaft 12 and disconnect shaft 16 may be provided adjacent to the first gear 24 enabling a more compact and axially shorter PTU and disconnect assembly. Also, in the implementation shown, the bearing 30 is not located between the flange 28 and the input shaft 12 and is instead provided between the flange 28 and the PTU housing 13. This locates an inner race 35 of the bearing 30 on the flange 28 and an outer race 37 adjacent to the housing 13. In at least some implementations, at least a portion of the connection feature 18 and/or a portion of the actuator 20 is received within the space 34 between the flange 28 and the input shaft 12 and is axially overlapped by the flange 28 and bearing 30.

To selectively drive the output shaft 14, the connection feature 18 may include a first part carried by the first gear 24 for rotation with the gear and a second part movable relative to the first part and carried by the input shaft 12 for rotation with the input shaft 12. In the implementation shown, the selective connection feature 18 includes a dog clutch mechanism. The first part of the dog clutch mechanism may include dog teeth 38 carried by the first gear 24, and in at least some implementations, the dog teeth 38 are formed directly in the gear 24, which means that the dog teeth 38 are features formed in the same piece of material as the other features of the gear 24. Alternatively, the dog teeth 38 could be formed in a separate component that is fixed to the first gear 24, otherwise carried by the first gear 24, or otherwise coupled to the disconnect shaft 16 for rotation with the shaft.

As shown in FIGS. 2-4, 6 and 13, the second part of the dog clutch mechanism may include a collar 40 carried by the input shaft 12 for rotation with the input shaft 12 and axially movable relative to the input shaft 12. In at least some implementations, the input shaft 12 and collar 40 include mating drive features that allow axial reciprocation of the collar 40 along the input shaft 12 and are radially overlapped to rotatably couple these components. In the implementation shown, the mating drive features include axially oriented and radially inwardly extending tabs 42 on the collar 40 and axially oriented and radially outwardly extending tabs 44 on the input shaft 12. Instead of or in addition to the tabs 42, 44, splines or other connection features can be used, as desired. The collar 40 may include dog teeth 46 arranged to engage the dog teeth 38 of the first gear 24. The dog teeth 38 and 46 may extend axially from the first gear 24 and collar 40, respectively, and be provided in a circumferential array. When the dog teeth 38 and 46 are meshed, the collar 40 (which is rotatably coupled to the input shaft 12) and the first gear 24 (which is rotatably coupled to the disconnect shaft 16) are rotatably coupled together, and hence, the input shaft 12 and disconnect shaft 16 are rotatably coupled together. While the dog teeth 38 and 46 are shown as being formed in opposed, axially facing surfaces of the collar 40 and first gear 24, other arrangements are possible, such as axially overlapped and radially facing surfaces or teeth.

The actuator 20 may include a drive that moves the dog clutch collar 40 relative to the input shaft 12. In at least some implementations, such as is shown in FIGS. 2-4, 7, 8 and 13, the drive includes a magnetic field generator such as a coil 50 and a magnetically responsive member, such as a plunger 52 movable when subjected to the generated magnetic field.

The coil 50 may be of any construction suitable to generate a magnetic field when current is provided to the coil 50. Instead of or in addition to the coil 50, a different drive mechanism may be provided to move the plunger 52 as desired. The drive may include a motor, pneumatic or hydraulic drive, or any other suitable arrangement. The coil 50 as shown in the illustrated embodiment may be compact and enable the disconnect device 11 to be contained within the body 15 and cover 17 of the housing 13, with minimal size increase over a PTU without a disconnect device. The coil 50 may require only a source of electrical power, such as wires 54 that can easily be passed through the housing 13. No external motor or mechanical input is required to pass through the housing in these implementations, although motors and other mechanical devices may be used as noted above.

The plunger 52 is responsive to and driven/moved by the generated magnetic field. In the implementation shown, the plunger 52 moves axially relative to the coil 50 and includes a main body 55 that is annular and received around the input shaft 12 for axial movement relative to the input shaft 12, and a magnetically responsive member 56 carried by the main body. Of course, the entire plunger 52 may be formed of a suitably magnetically responsive material, but in at least some implementations, this may be more expensive than the two-part body shown in the drawings. An axial end face 58 of the plunger 52 may be engaged with an adjacent surface of the collar 40 so that movement of the plunger 52 toward the collar 40 causes the collar 40 to move.

A spring 60 or other biasing member may yieldably urge the collar 40 into engagement with the plunger 52, if desired. The spring 60 may assist decoupling movement of the collar 40 away from the first gear 24 when the plunger 52 is retracted away from the collar 40, as will be described later. To retain the position of and back-up the spring 60, a retaining ring 62 may be received in a groove formed in input shaft 12.

In at least some implementations, it may be desirable to latch, hold, lock or otherwise maintain the disconnect device 11 in one or both of its disconnected and connected positions that correspond to the first and second modes of vehicle operation, respectively. This may be done to avoid unintended switching between the modes of vehicle operation either due to a loss of electrical power in the vehicle or otherwise. Further, this may avoid having to drive the coil 50 the entire time that it is desired to couple or decouple the input shaft 12 and disconnect shaft 16, which would consume energy, generate heat and possibly shorten the life of the actuator. To do this, a retention feature 64 may be provided.

In the implementation shown the retention feature 64 includes a cam 66, a follower 68 and a retainer 70, as shown in FIGS. 2-4 and 13-20. The cam 66 may be carried by the plunger 52 for movement with the plunger 52, and may be connected thereto or formed in one-piece with the plunger 52. The cam 66 may include an axially variable cam surface 72 that includes one or more peaks 74 and valleys 76. The cam surface 72 may face axially and be provided on a face of the plunger 52 opposite to the collar 40.

Figure 9:
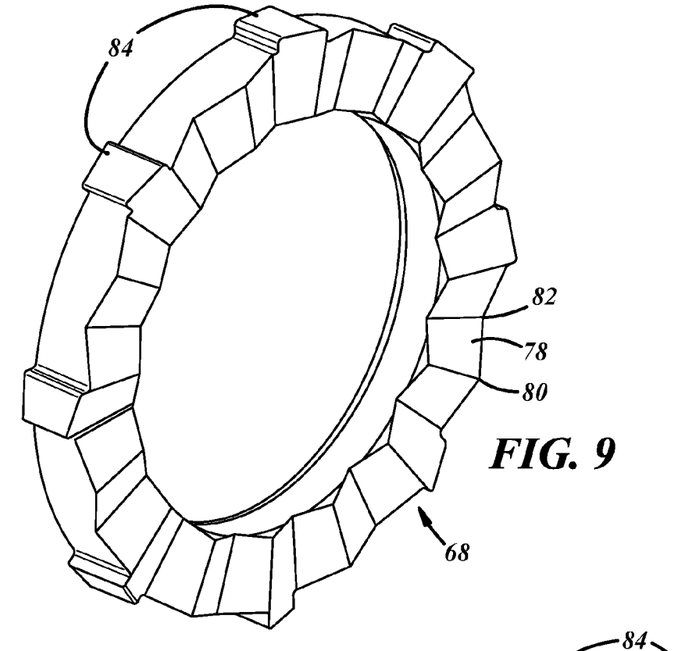
FIGS. 9 and 10 are perspective views of a follower.
Figure 10:
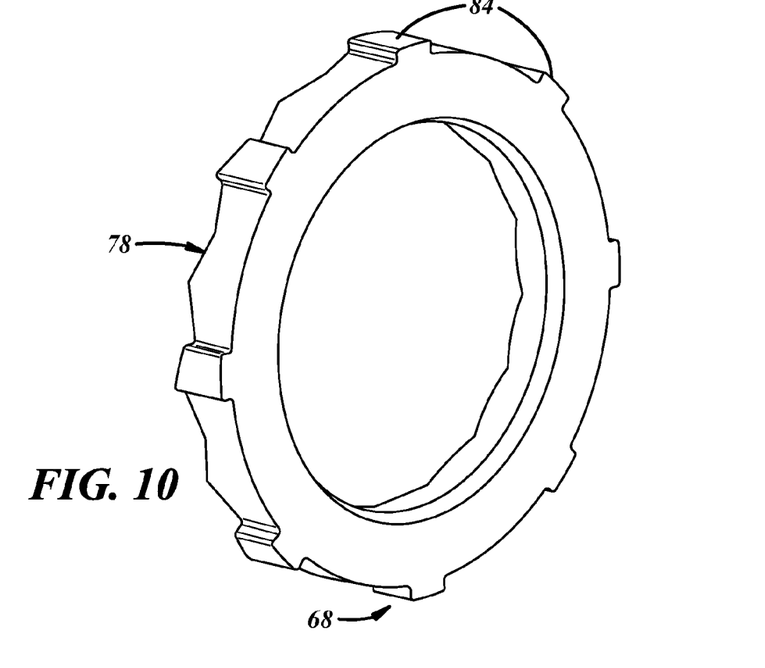

The follower 68, as best shown in FIGS. 9 and 10, may include an engagement surface 78 generally opposed to and facing the cam surface. The engagement surface 78 may also be axially variable with one or more peaks 80 and valleys 82. The peaks 80 and valleys 82 of the follower 68, in the example shown, are circumferentially or rotationally out of phase with the peaks 74 and valleys 76 of the cam surface 72 (in other words, the engagement surface 78 and cam surface 72 are out of phase). In this way, when the cam 66 is moved axially relative to the follower 68, the follower 68 is rotated, as will be described in more detail below. A spring 83 may yieldably bias the follower 68 into engagement with the cam 66, and drive the plunger 52 into the collar 40 and the collar into engagement with the first gear 24, as will be described in more detail below. The follower 68 may include one or more retention features adapted to engage the retainer to limit or prevent movement of the follower 68 relative to the retainer in certain positions of the follower 68. In the implementation shown, the retention features of the follower 68 include one or more radially outwardly extending and axially oriented nubs 84.

Figure 11:
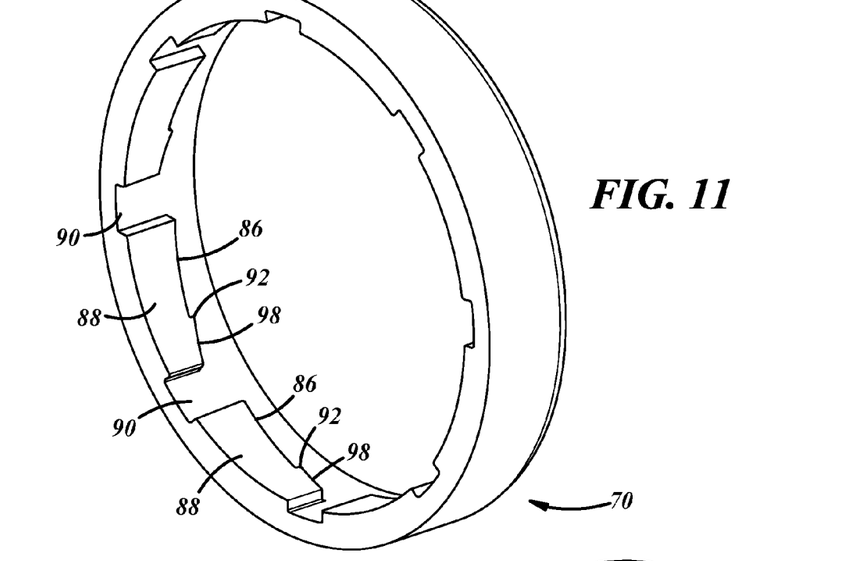
FIGS. 11 and 12 are perspective views of a retainer.
Figure 12:
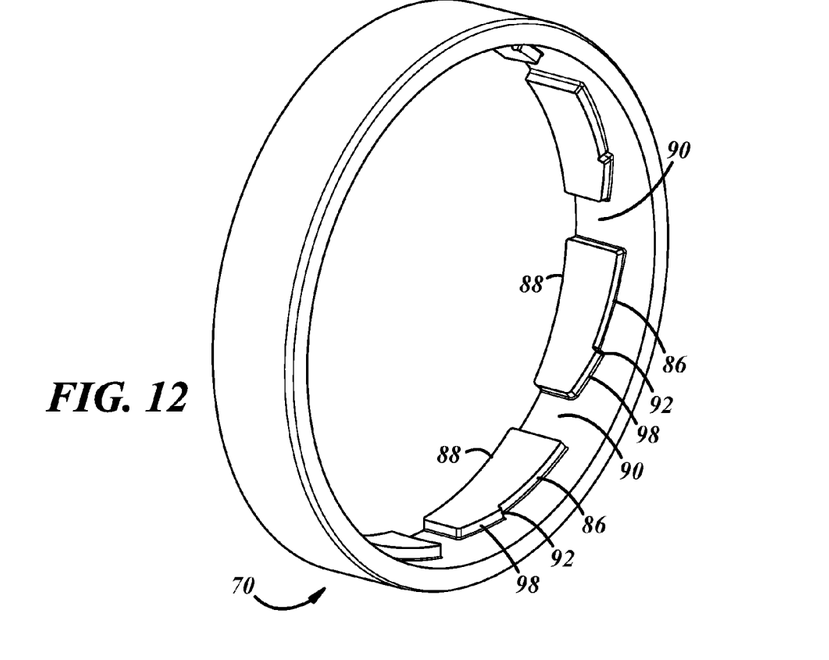

The retainer 70, as best shown in FIGS. 11 and 12, may be annular and provided adjacent to and surrounding at least part of the follower 68, and may include one or more stop surfaces 86 that cooperate with the nubs 84 on the follower 68 to inhibit or prevent movement of the follower 68 when desired. The stop surfaces 86 of the retainer 70 include or are defined by radially inwardly extending protrusions 88 that radially overlap and are selectively engaged with the nubs 84.

In more detail, the stop surfaces 86 have axial variations to control axial movement of the follower 68 relative to the retainer 70. Portions of the retainer 70 may include sufficient axial clearance to permit the follower 68 to engage the cam 66 and move the plunger 52 into its advanced position to engage the collar dog teeth 46 with the gear dog teeth 38. This clearance may be provided by one or more voids, such as a gap 90 between adjacent protrusions 88, or a recess or slot of sufficient axial depth. The stop surfaces 86 may also include sufficient axial dimension to hold the follower 68 against the spring 83 sufficiently so that the plunger 52 may move or be moved sufficiently toward its retracted position to enable the collar dog teeth 46 to be disengaged from the gear dog teeth 38. In other words, the retainer 70 may isolate the force of the spring 83 from the cam 66 so that the plunger 52 can move toward its retracted position to decouple the input shaft 12 and disconnect shaft 16. The protrusions 88 may further include a latch 92 or catch surface that extends axially from an adjacent stop surface 86 and is adapted to prevent rotation of the follower 68 when a retention feature of the follower 68 is engaged therewith.

In at least some implementations, the disconnect device 11 is biased into either the disconnected or connected position. In the example shown, the spring 83 or other biasing member acts on the follower 68 to yieldably bias the follower 68 into engagement with the cam 66 and bias the plunger 52 toward its advanced position. In this position, the collar dog teeth 46 are engaged with the gear dog teeth 38 and the input and output shafts 12 and 14 are coupled together via the disconnect shaft 16. Accordingly, absent a force in addition to the spring 83 and strong enough to displace the plunger 52 toward its retracted position, the plunger 52 remains in its advanced position. A spring retainer 96 may be carried in a groove formed in the housing 13 to retain the spring 83 within the housing and provide a surface against which one end of the spring 83 is engaged.

Figure 13:
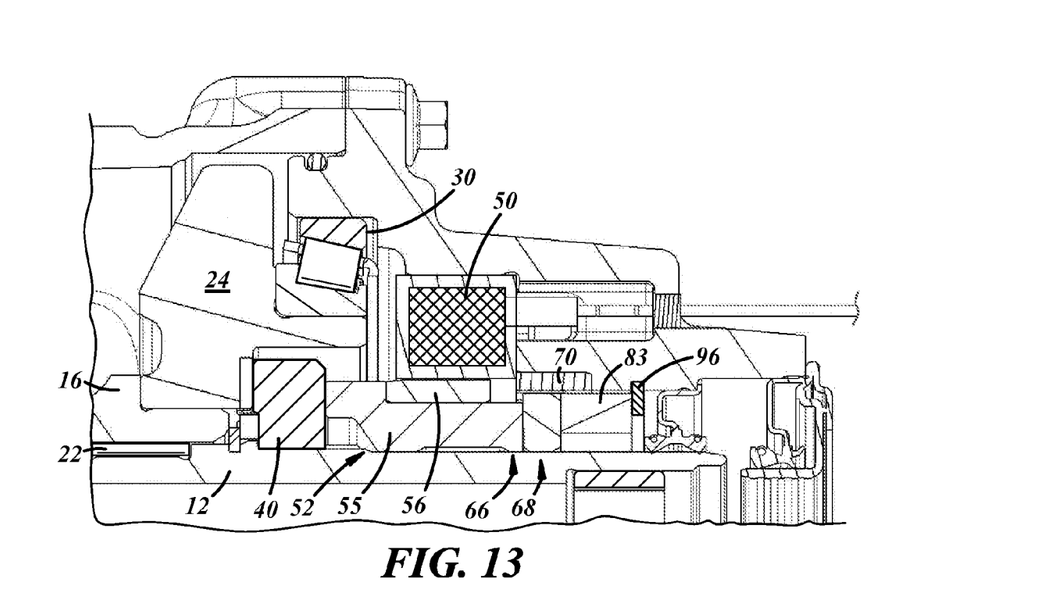
FIG. 13 is a fragmentary sectional view showing the disconnect device in a connected position.
Figure 14:
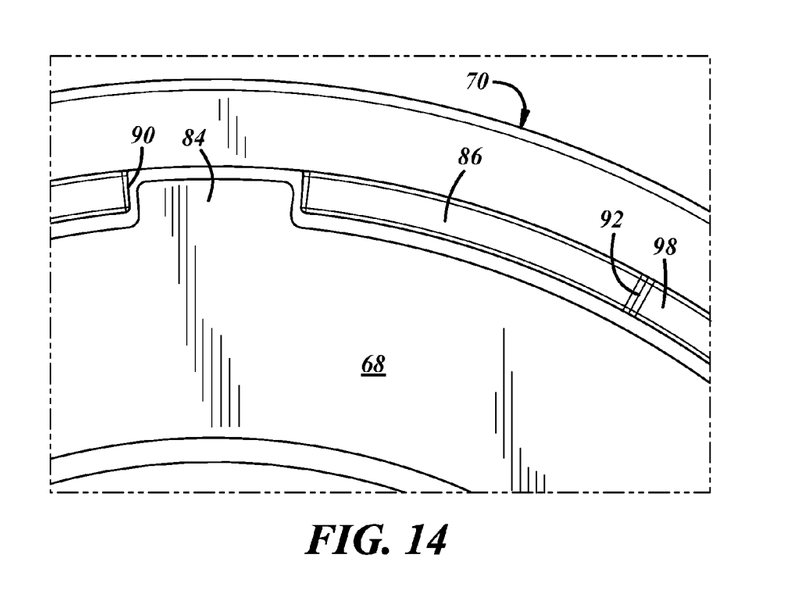
FIG. 14 is an enlarged, fragmentary plan view of a portion of the follower and a portion of the retainer in an unlocked position.
Figure 15:
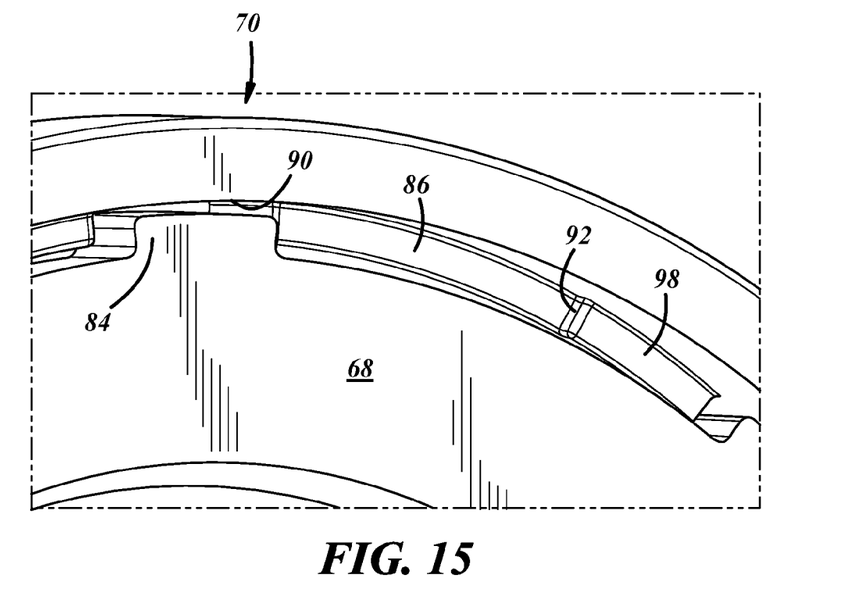
FIG. 15 is an enlarged, fragmentary perspective view of a portion of the follower and a portion of the retainer in the unlocked position.
Figure 16:
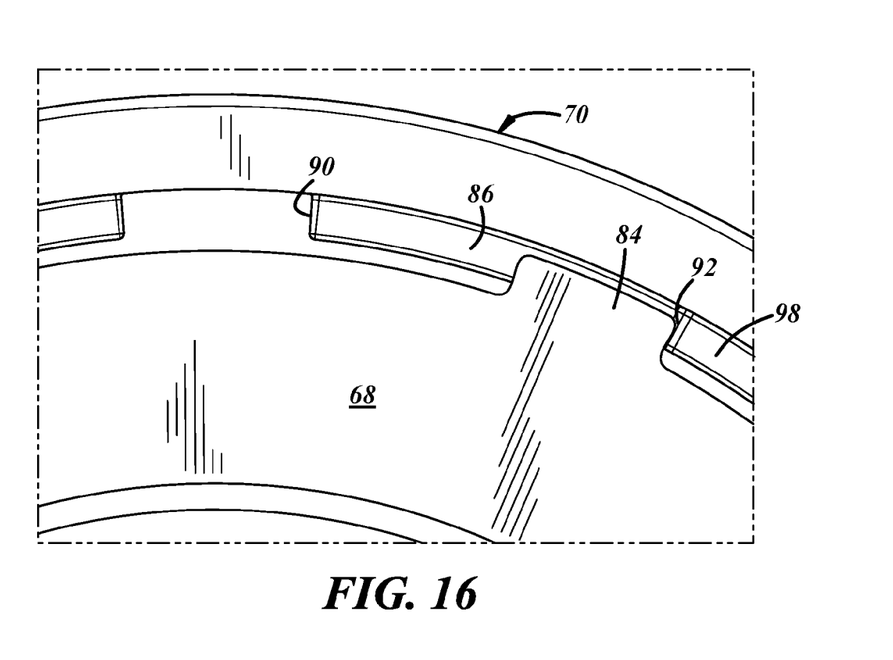
FIG. 16 is an enlarged, fragmentary plan view of a portion of the follower and a portion of the retainer in a locked position.
Figure 17:
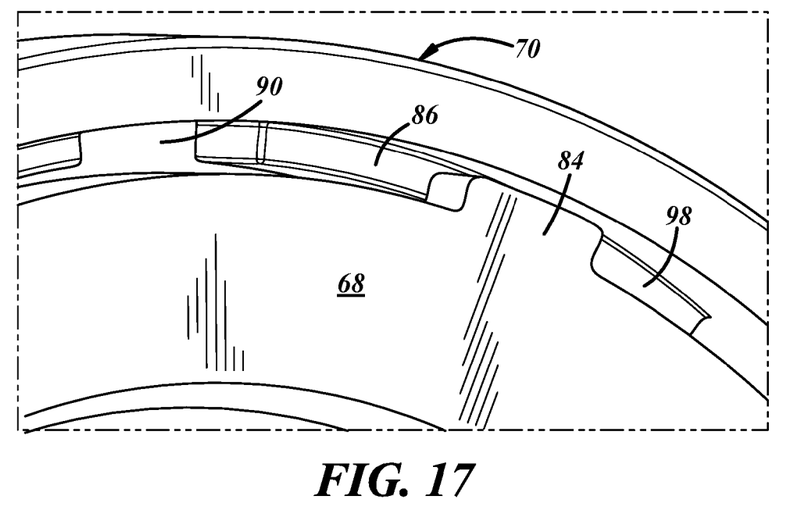
FIG. 17 is an enlarged, fragmentary perspective view of a portion of the follower and a portion of the retainer in the locked position.
Figure 18:
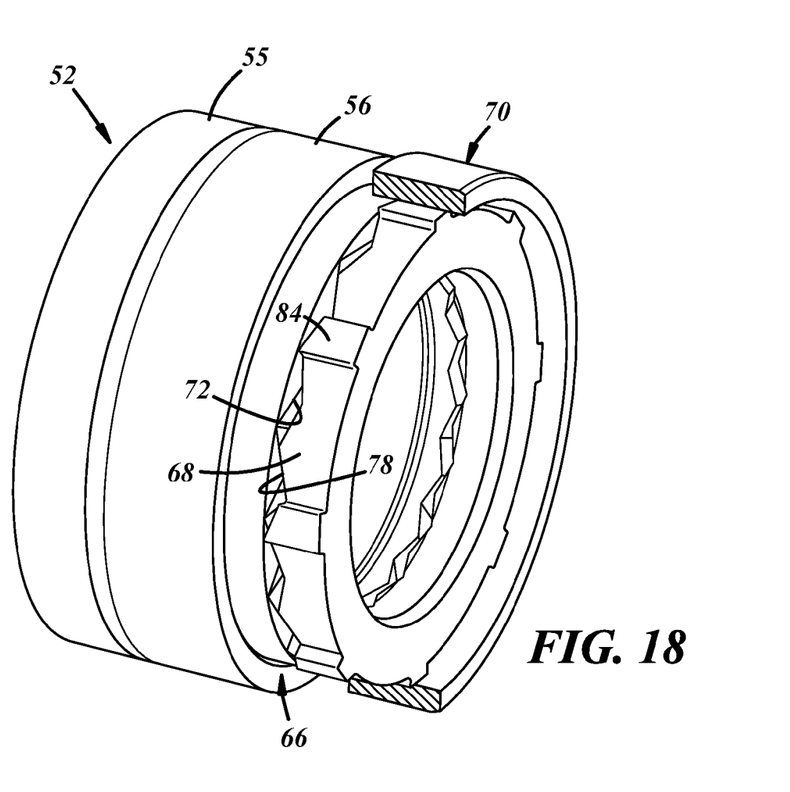
FIG. 18 is a perspective view of the plunger, follower and the retainer in the unlocked position and with a portion of the retainer cut away to illustrate the follower and cam engagement.
Figure 19:
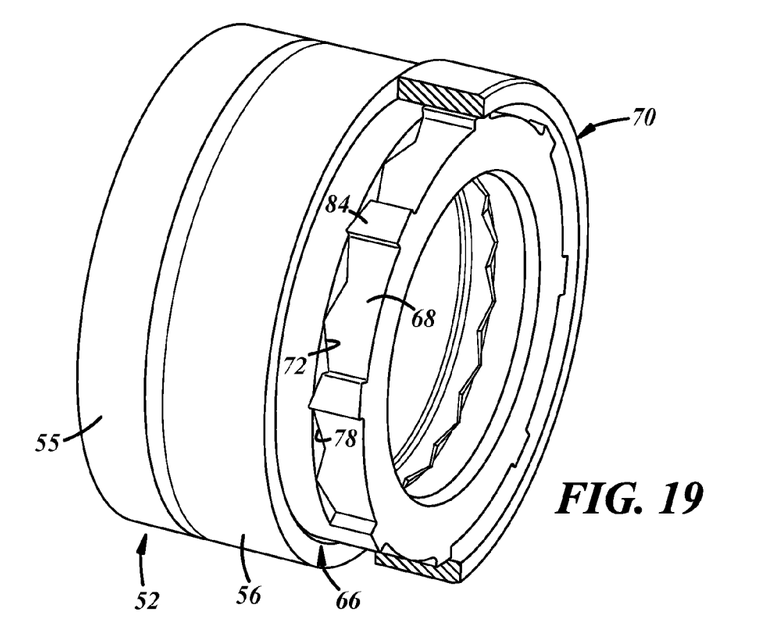
FIG. 19 is a view similar to FIG. 18 showing the components in a position between the locked and unlocked positions.
Figure 20:
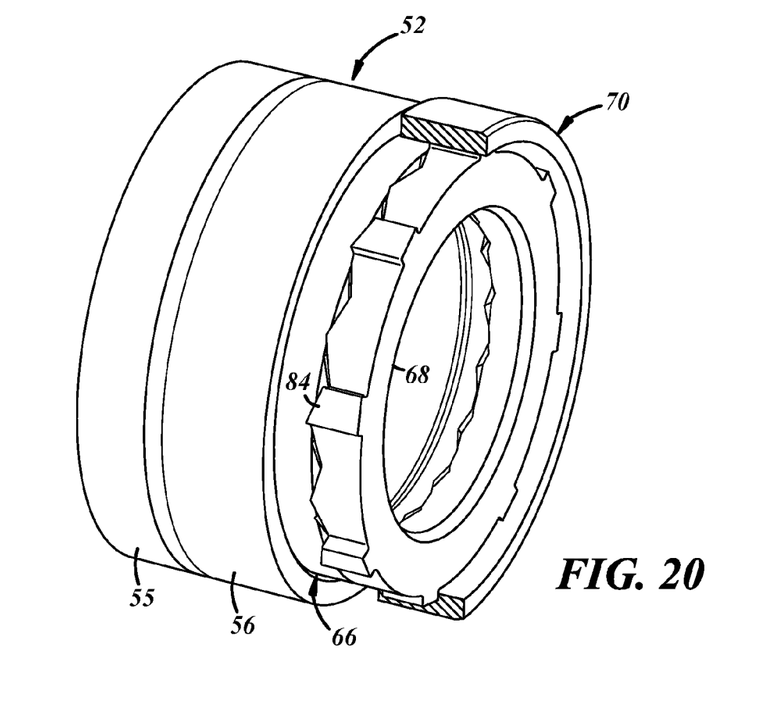
FIG. 20 is a view similar to FIG. 18 showing the components in the locked position.

The operation of the disconnect device 11 as shown in the drawings, which show only one of many possible embodiments, will now be described. Starting with the disconnect device 11 in its connected position, as shown in FIG. 13-15, wherein the plunger 52 is advanced to engage the collar dog teeth 46 with the gear dog teeth 38, when electrical power is provided to the coil 50, the coil 50 generates a magnetic field that drives the plunger 52 toward its retracted position, in the direction of the follower 68. This compresses the spring 83 acting on the follower 68 and permits the spring 60 acting on the collar 40 to move the collar 40 away from the first gear 24 so that the collar dog teeth 46 are no longer meshed with the first gear dog teeth 38. In this position, the disconnect shaft 16 is not coupled to the input shaft 12 so the output shaft 14 is not driven for rotation.

During movement of the plunger 52 toward its retracted position, the cam surface 72 engages the follower 68 and displaces the follower 68 axially. The axial displacement of the follower 68 compresses the spring 83 and moves the nubs 84 axially within the gaps 90 and beyond the retainer stop surfaces 86 (FIGS. 14, 15, 18 and 19). The cam 66 also rotates the follower 68 due to the out of phase cam and engagement surfaces 72, 78 on each component and the rotation of the follower 68 overlaps the nubs 84 and stop surfaces 86. Rotation of the follower 68 may be limited by engagement of one or more nubs 84 with one or more latches 92, as noted above. This prevents unintentional rotation of the follower 68 which may decouple the follower 68 from the retainer 70. When power to the coil 50 is terminated, the magnetic field is no longer generated and the spring 83 tends to displace the follower 68 toward the plunger 52, which movement is limited or prevented by engagement of the follower nubs 84 with the retainer stop surfaces 86. In this way, the force of the spring 83 is isolated from the plunger 52 and the other spring 60 maintains the collar 40 disengaged from the gear, as shown in FIGS. 2 and 3. Even if power is lost to the coil 50, the disconnect assembly will maintain this position due to the secure engagement of the follower 68 with the retainer 70.

To return the disconnect device 11 to its connected position, the follower 68 is disengaged from the retainer 70. To do this, the coil 50 may again be energized to generate a magnetic field that displaces the plunger 52 toward its retracted position (e.g. further in the direction of the follower 68) which axially displaces the follower 68 against the spring 83 and further compresses the spring 83 so that the nubs 84 are axially clear of the latches 92. The axial movement of the follower 68 also causes the follower 68 to rotate due to the out of phase cam surface 72 and engagement surface 78 so that the nubs 84 pass over the latches 92. To assist in rotating the follower 68, the retainer protrusions 88 may include ramps 98 or sloped surfaces adjacent to the latches 92 such that engagement of the nubs 84 with the ramps 98 tends to rotate the follower 68 and move the nubs 84 toward the gaps 90 in the retainer 70. When the nubs 84 are circumferentially aligned with the gaps 90, and the coil 50 is not energized, the follower 68 may move axially relative to the retainer 70 under the force of the spring 83 so that the follower 68 engages and displaces the plunger 52. The plunger 52, in turn, engages and displaces the collar 40 to engage the collar dog teeth 46 with the gear dog teeth 38 and couple the disconnect shaft 16 to the input shaft 12 to drive the output shaft 14.

Hence, the retainer 70 holds the disconnect device 11 in its disconnected position, and absent engagement of the follower 68 with the retainer 70, the disconnect device 11 is biased to its connected position. Both positions can be maintained in the event power is lost to the drive to inhibit or prevent unintended or not commanded change between the first and second modes of vehicle operation.

While described with reference to a magnetic field generator, many of the features of the described disconnect device 11 can be used with a different drive mechanism. Further, while the first gear 24 is described as having teeth 27 that mesh with the output shaft gear 26, dog teeth 38 that mesh with the collar dog teeth 46 and a bearing surface 28 all integrally formed in the same piece of material, these components could be separately formed and connected together or left independent, as desired. Still further, while the coil 50 is described as driving the plunger 52 in only one direction to achieve the two positions described, the coil 50 or a different drive may actively drive the plunger 52 to and between both positions, as desired. The described arrangement may reduce costs and overall size of the assembly by provided a single acting coil 50 that acts as a switch to move the components. That is, the coil 50 can be energized momentarily to cause a desired position change and need not be energized for any significant length of time. Further, two coils need not be provided to move the plunger 52 in two different directions, which reduces cost and can reduce the overall assembly size. Conveniently, in at least some implementations, such as that shown in the drawings, the disconnect assembly can be readily fitted into a standard PTU housing and may require only a slight larger cover (e.g. due to the larger diameter bearing and/or the coil 50 placed radially surrounding the input shaft and plunger 52).

Figure 21:
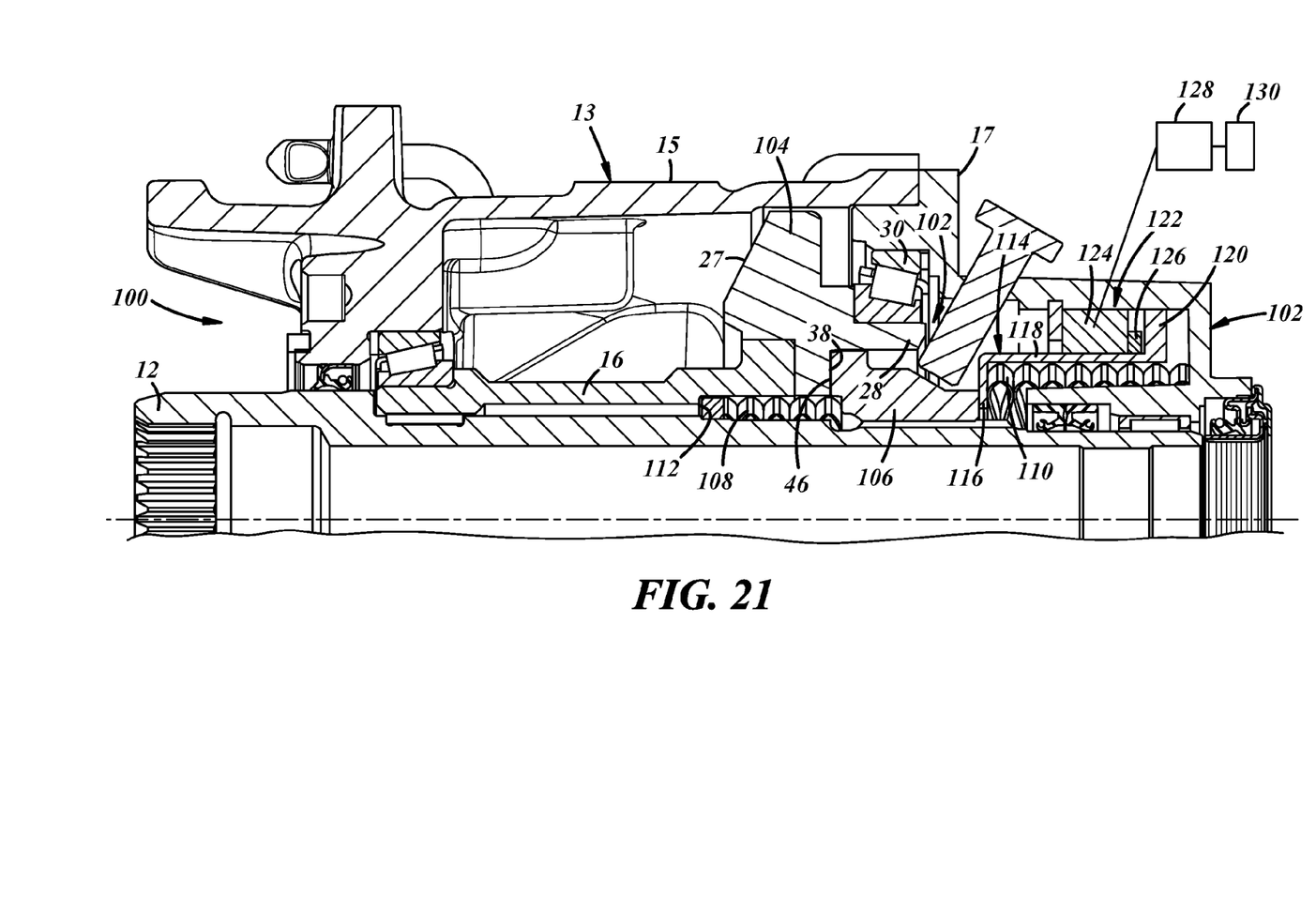
FIG. 21 is a sectional view of a PTU with a disconnect device similar to that shown in FIGS. 1-3.

An alternate PTU 100 and disconnect device 102 is shown in FIG. 21. Similar components will be given the same reference numbers as in the prior PTU 10 and disconnect device 11 to facilitate the description and understanding of this assembly. As shown, this implementation includes a gear 104 coupled to the disconnect shaft 16 for rotation with the disconnect shaft 16. The gear 104 may formed similarly to the previously described gear 24, and may include teeth 27 for meshing with the output shaft gear, dog teeth 38 and a bearing surface 28 to support a bearing 30 radially spaced from the input shaft 12. A collar 106 may include dog teeth 46 that mate with the gear dog teeth 38 and opposed springs 108, 110 may act on the collar 106.

A first spring 108 biases the collar 106 away from the gear 104 and a second spring 110 biases the collar 106 toward and into engagement with the gear 104. The first spring 108 may be received in an annular gap 112 provided between the input shaft 12 and one or both of the disconnect shaft 16 and the gear 104 and may act at one end on a surface of the collar 106 spaced from the dog teeth 46. The second spring 110 may be retained in a housing 114. The housing 114 may have a first flange 116 extending inwardly from an end of a sidewall 118 that engages an end of the collar 106 and a second flange 120 spaced from the first flange 116. The second flange 120 may extend outwardly from the sidewall 118 and provide a surface engageable by a drive mechanism 122.

The drive mechanism 122 may selectively displace the housing 114 to permit the collar 106 to move relative to the gear 104 and provide the connected and disconnected positions of the disconnect device 102. When the housing 114 is forced into the collar 106 by the second spring 110, the collar 106 is engaged with the gear 104 and the disconnect device 102 is in its connected state wherein the output shaft 14 is driven for rotation. When the drive mechanism 122 displaces the housing 114 against the force of the second spring 110 and away from the collar 106, the first spring 108 displaces the collar 106 away from the gear 104 and the disconnect device 102 is then in its disconnected state wherein the output shaft 14 is not driven for rotation.

The drive mechanism 122 may include any desired mechanism. As shown, a cam 124 and follower 126 are provided, and may be similar in function to the prior cam 66 and follower 68. The cam 124 may be rotated by a worm gear 128 driven by a motor 130, or by any other device. The cam 124 could also be axially moved to axially move and rotate the follower 126 as previously described. Axial movement of the follower 126 toward the second flange 120 displaces the housing 114 against the second spring 110 and permits the disconnect device 102 to move to its disconnected position. The disconnected position could be retained by a suitable locking or retention mechanism, such as the retainer 70 as previously described, or the worm gear may simply hold the cam and follower in position, even if the motor driving the worm gear is not powered/activated. As in the previously discussed implementation, the connected position of the disconnect device 102 could be maintained by the force of the second spring 110 (when the follower 126 is positioned to permit such movement), or otherwise as desired. The function of the disconnect device 102 may be the same as or similar to the disconnect device 11, and so a description thereof will not be repeated.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. For example, while shown and described with reference to a PTU, features of the disconnect device, separately and in various combinations, may be used in other disconnect devices, such as for side shaft or other vehicle driveline components. By way of further non-limiting example, a gear including part of a connection feature (e.g. dog clutch teeth) and/or part of a bearing surface, may be used in a disconnect device for a component other than a PTU. Likewise, the cam, cam follower and retainer arrangement can be used in devices other than a PTU disconnect device. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

All terms used in the claims are intended to be given their broadest reasonable constructions and their ordinary meanings as understood by those skilled in the art unless an explicit indication to the contrary in made herein. In particular, use of the singular articles such as "a," "the," "the," etc. should be read to recite one or more of the indicated elements unless a claim recites an explicit limitation to the contrary. The term "shaft" is not intended to apply any specific structure such as a tubular or solid and generally cylindrical component. A "shaft" may have other shapes, need not be longer than it is thick or wide, etc.

While the forms of the disclosure constitute presently preferred embodiments, many others are possible. It is not intended herein to mention all the possible equivalent forms or ramifications of the disclosure. It is understood that the terms used herein are merely descriptive, rather than limiting, and that various changes may be made without departing from the spirit or scope of the invention.

The invention claimed is:

1. A disconnect assembly for a driveline component, comprising:
   an input shaft rotated about an axis;
   a disconnect shaft selectively rotated by the input shaft;
   a first gear coupled to the disconnect shaft for rotation with the disconnect shaft;
   an output shaft;
   a second gear coupled to the output shaft and to the first gear so that the output shaft rotates when the disconnect shaft rotates; and
   a connection feature that is movable between an engaged position in which the input shaft and disconnect shaft are coupled for co-rotation and a disengaged position in which the input shaft rotates relative to the disconnect shaft, the connection feature including a first part carried by the first gear for rotation with the first gear and a second part movable relative to the first part and carried by the input shaft for rotation with the input shaft, wherein the connection feature is driven to the disengaged position and releasably held in the disengaged position and the connection feature is biased to the engaged position so that the connection feature remains in the engaged position absent a stronger force applied to the connection feature.

2. The disconnect assembly of claim 1 wherein the first part of the connection feature includes dog teeth formed in the first gear and the second part of the connection feature includes a collar with mating dog teeth providing a dog clutch that couples the input shaft and disconnect shaft.

3. The disconnect assembly of claim 1 wherein the first gear also carries a bearing surface for a bearing that journals the disconnect shaft for rotation.

4. The disconnect assembly of claim 3 wherein the bearing surface is radially spaced from the input shaft and at least a portion of the first part of the connection feature is located radially between the bearing surface and the input shaft.

5. The disconnect assembly of claim 4 wherein at least a portion of the second part of the connection feature is received radially between the input shaft and the bearing surface.

6. The disconnect assembly of claim 2 wherein the first gear includes gear teeth that are meshed with teeth on the second gear, and the first gear dog teeth face axially away from the first gear teeth.

7. A driveline component for a vehicle, comprising:
   an input shaft rotated about an axis;
   a disconnect shaft selectively rotated by the input shaft;
   an output shaft coupled to the disconnect shaft to rotate when the disconnect shaft rotates; and
      a disconnect device that selectively couples together the input shaft and the disconnect shaft so that the output shaft is selectively rotated, the disconnect device includes a connection feature that is movable between an engaged position in which the input shaft and disconnect shaft are coupled and a disengaged position in which the input shaft rotates relative to the disconnect shaft, the disconnect device includes an actuator that causes movement of the connection feature from at least one of the engaged position and the disengaged position to the other of the engaged position or disengaged position, and the disconnect device includes a retention feature that releasably retains the connection feature in at least one of the engaged position or disengaged position; wherein the actuator includes a drive, a cam driven by the drive and a follower responsive to at least some movement of the cam, and wherein the retention feature selectively engages the follower to at least inhibit movement of the follower and retain the connection feature in either its engaged position or disengaged position.

8. The driveline component of claim 7 which also includes a biasing member acting on the follower to bias the follower into the cam and the connection feature to its engaged position, and when the retention feature is engaged with the follower the connection feature can move to its disengaged position.

9. The driveline component of claim 8 which also includes a second biasing member that acts on at least part of the connection feature to yieldably bias the connection feature to its disengaged position so that when the retention feature is engaged with the follower, the second biasing member moves the connection feature to its disengaged position.

10. The driveline component of claim 7 wherein the retention feature includes a stop surface and the follower includes at least one retaining feature that engages the stop surface in at least one position of the follower to limit movement of the follower toward the cam.

11. The driveline component of claim 7 wherein the cam includes an axially varied cam surface and the follower includes an axially varied cam surface that is out of phase with the cam surface of the cam so that axially movement of the cam toward the follower axially displaces and rotates the follower.

12. The driveline component of claim 11 wherein the retention feature includes a stop surface and the follower includes a retaining feature, and wherein the retaining feature overlaps the stop surface when the connection feature is in its disengaged position and the retaining feature is rotated out of alignment with and does not overlap the stop surface when the connection feature is in its engaged position.

13. The driveline component of claim 7 wherein the drive includes a coil that generates a magnetic field when energized and a plunger that is driven in at least one direction by the generated magnetic field, and wherein the connection feature includes a first part carried by the disconnect shaft and a second part carried by the input shaft and the second part of the connection feature is movable relative to the first part by the plunger to move the connection feature to its engaged position.

14. The driveline component of claim 13 wherein the coil is energized to move the plunger in a first direction to cause the connection feature to move from the engaged position to the disengaged position and the coil is energized to move the plunger in the first direction to cause the connection feature to move from the disengaged position to the engaged position.

15. The driveline component of claim 7 wherein the connection feature includes a first part rotated with the disconnect shaft and a second part rotated with the input shaft and the drive includes a plunger that is driven in a first direction to cause the connection feature to move from the engaged position to the disengaged position and the plunger is driven in the first direction to cause the connection feature to move from the disengaged position to the engaged position.

16. The driveline component of claim 7 wherein the connection feature is driven by the actuator to the disengaged position and releasably held by the retention feature in the disengaged position and the connection feature is biased to the engaged position so that the connection feature remains in the engaged position absent a stronger force applied by the actuator.

17. The disconnect assembly of claim 4, wherein the portion of the first part of the connection feature is located axially between the first gear teeth and the bearing surface.

18. The disconnect assembly of claim 5, wherein the portion of the second part of the connection feature is located axially between the first gear teeth and the bearing surface.

19. A driveline component for a vehicle, comprising:
an input shaft rotated about an axis;
a disconnect shaft selectively rotated by the input shaft;
an output shaft coupled to the disconnect shaft to rotate when the disconnect shaft rotates; and
a disconnect device that selectively couples together the input shaft and the disconnect shaft so that the output shaft is selectively rotated, the disconnect device includes a connection feature that is movable between an engaged position in which the input shaft and disconnect shaft are coupled and a disengaged position in which the input shaft rotates relative to the disconnect shaft, the disconnect device includes a drive that causes movement of the connection feature from at least one of the engaged position and the disengaged position to the other of the engaged position or disengaged position, and the disconnect device includes a retention feature that releasably retains the connection feature in at least one of the engaged position or disengaged position, wherein the drive includes a coil that generates a magnetic field when energized and a plunger that is driven in at least one direction by the generated magnetic field, and wherein the connection feature includes a first part carried by the disconnect shaft and a second part carried by the input shaft and the second part of the connection feature is movable relative to the first part by the plunger to move the connection feature to its engaged position, and wherein the coil is energized to move the plunger in a first direction to cause the connection feature to move from the engaged position to the disengaged position and the coil is energized to move the plunger in the first direction to cause the connection feature to move from the disengaged position to the engaged position.

* * * * *